United States Patent [19]

Christenson et al.

[11] 4,249,939
[45] Feb. 10, 1981

[54] METHOD OF DISPOSING OF SPENT ORGANIC COMPLEXING SOLUTIONS CONTAINING CUPROUS HALIDES

[75] Inventors: Christopher P. Christenson; Gary M. McNamee; Ralph H. Delaune, all of Lake Jackson, Tex.

[73] Assignee: The Dow Chemical Company, Midland, Mich.

[21] Appl. No.: 109,376

[22] Filed: Jan. 3, 1980

Related U.S. Application Data

[63] Continuation of Ser. No. 952,748, Oct. 19, 1978, abandoned.

[51] Int. Cl.³ .............................................. C22B 15/12
[52] U.S. Cl. ..................... 75/109; 75/0.5 A; 75/117; 423/42; 423/46
[58] Field of Search .................. 75/0.5 A, 109, 117; 423/42, 46

[56] References Cited

U.S. PATENT DOCUMENTS

| | | | |
|---|---|---|---|
| 3,231,503 | 1/1966 | Laue | 75/118 R |
| 3,840,365 | 10/1974 | Hammes et al. | 75/117 X |
| 3,845,188 | 10/1974 | Walker et al. | 423/42 |
| 3,905,827 | 9/1975 | Goffredo | 134/13 |
| 4,153,452 | 5/1979 | Keyworth et al. | 75/101 BE |
| 4,153,669 | 5/1979 | Keyworth et al. | 423/24 |

OTHER PUBLICATIONS

Chem. Abst., 15293k, Jan. 1975.

*Primary Examiner*—G. Ozaki
*Attorney, Agent, or Firm*—J. G. Carter; G. R. Baker

[57] ABSTRACT

Copper is removed from spent solutions of complexing agents containing cuprous aluminum tetrahalide, such as $CuAlCl_4$.toluene by (1) contacting said solutions with water so as to form a precipitate of cuprous halide, an aqueous phase and an organic phase; (2) oxidizing the cuprous halide to cupric halide thereby rendering it water soluble; (3) separating the organic phase and aqueous phase, (4) contacting the aqueous phase with an environmentally suitable metal higher than copper in the electromotive series, such as aluminum, thereby precipitating copper metal and (5) separating the precipitated copper metal from the aqueous salt-containing mixture.

Alternatively, the spent complex solutions can be contacted with 1 molar to 6 molar aqueous solution of a non-oxidizing acid such as HCl thereby eliminating the necessity of the oxidizing step (2) since the cuprous halide is soluble in the acidified aqueous phase.

10 Claims, No Drawings

METHOD OF DISPOSING OF SPENT ORGANIC COMPLEXING SOLUTIONS CONTAINING CUPROUS HALIDES

CROSS-REFERENCE TO RELATED APPLICATION

This is a continuation of application Ser. No. 952,748, filed Oct. 19, 1978, now abandoned.

BACKGROUND OF THE INVENTION

Various bimetallic salts and derivatives thereof have been employed in the preparation of scavengers or complexing agents for various liquids such as olefins, aromatics, carbon monoxide and the like as disclosed in U.S. Pat. Nos. 3,592,865; 3,647,843; 3,651,159; 3,754,047 and 3,755,487. One of the more popular bimetallic salts is cuprous aluminum tetrahalide ($CuAlX_4$) generally prepared by reacting a cuprous halide with an aluminum trihalide in a suitable solvent.

During prolonged use of these complexing agents, particularly when the feed streams contain olefins and the solvent is an aromatic solvent such as toluene, these agents become contaminated with alkylated aromatics i.e. the aromatic solvent is alkylated by reaction with the olefins which changes the boiling point thereby lowering the efficiency of the recovery process. Disposal of the spent complexing solutions become a problem because they also contain cuprous halides, mostly in the form of $CuAlX_4$, and the copper ions are not acceptable in waste treatment bio ponds. Therefore there has not been discovered a method for removing the copper from such spent or used complexing solutions.

SUMMARY OF THE INVENTION

The present invention pertains to a process for removing copper from spent cuprous aluminum tetrahalide complexing solutions which process comprises:

(1) mixing said spent solution with at least 0.5, preferably from about 0.5 to about 3, most preferably from about 0.95 to about 1.05 parts by weight of water per part by weight of said solution, thereby forming a solid precipitate of cuprous halide, an organic phase and an aqueous phase;

(2a) contacting, while agitating, the mixture of step 1 with a suitable oxidizing agent in a suitable quantity for a time sufficient to convert the water insoluble cuprous halide to water soluble cupric halide and separating the organic phase and the aqueous phase; or alternatively (2b) separating the organic phase and the aqueous phase and contacting, while agitating, the aqueous phase containing the insoluble cuprous halide with a suitable oxidizing agent in a suitable quantity for a time sufficient to convert the water insoluble cuprous halide to water soluble cupric halide;

(3) contacting the aqueous phase containing the dissolved cupric halide with an environmentally acceptable metal higher than copper in the electromotive series thereby precipitating copper metal and (4) recovering by suitable means, the precipitated copper metal.

In a preferred process for recovering copper from spent cuprous aluminum tetrahalide complexing solutions, the process comprises:

(1) mixing said solution with at least 0.5, preferably from about 0.5 to about 3, most preferably from about 0.95 to about 1.05 parts by weight of a 1 molar to 6 molar preferably 1 molar to 2 molar aqueous solution of a non-oxidizing acid per part by weight of said complexing solution thereby forming an aqueous phase containing the cuprous halide and an organic phase;

(2) separating the organic phase and the aqueous phase;

(3) contacting the aqueous phase containing the dissolved cuprous halide with an environmentally acceptable metal higher than copper in the electromotive series thereby precipitating copper metal and (4) recovering by suitable means, the precipitated copper metal.

DETAILED DESCRIPTION OF THE PREFERRED EMBODIMENTS

Particularly suitable cuprous aluminum halide solvent complexes which can be treated by the process of the present invention include, for example, the chlorides, bromides and iodides preferably the chlorides. Particularly suitable solvents are the aromatic solvents, such as, for example, benzene, toluene, xylene, ethylbenzene, mixtures thereof and the like, preferably toluene.

Particularly suitable non-oxidizing acids which can be employed include for, example, HCl, HBr, $H_2SO_4$, $H_3PO_4$, mixtures thereof and the like, particularly, HCl.

Particularly suitable oxidizing agents include, for example, $O_2$, air, $Cl_2$, $Br_2$, alkali or alkaline earth metal oxyhalides such as, for example, NaOCl, NaOBr, KOCl, LiOCl, $Ca(OCl)_2$, $Ba(OCl)_2$, $Mg(OCl)_2$, mixtures thereof and the like. The oxidizing agent is employed in sufficient quantities to convert substantially all of the $Cu^+$ copper to $Cu^{++}$ copper so as to render the copper salt soluble in the aqueous phase; therefore, at least 1 equivalent of oxidizing agent per equivalent of cuprous copper ion is employed, preferably from about 1 to about 5 and most preferably from about 1.1 to about 1.5 equivalents of oxidizing agent per equivalent of cuprous ion is employed.

In some instances it is desirable to slightly acidify the aqueous mixture to lower the pH to below 7 before contacting it with the oxidizing agent, so as to speed the oxidation process particularly when oxidizing agents such as the alkali or alkaline earth metal oxyhalides are employed since they oxidize more efficiently under acidic conditions.

Suitable metals which are acceptable to environmental bio treatment ponds include, for example, Fe, Al, Mg, mixtures thereof and the like with aluminum being preferred. The quantity of metal is that quantity sufficient to reduce substantially all of the cuprous ($Cu^+$) or cupric ($Cu^{++}$) copper to copper metal; therefore at least 1, preferably from about 1 to about 10, most preferably from about 1.0 to about 2.0 equivalents of metal per equivalent of cuprous or cupric copper ion is employed.

In step 1, the spent solvent solution is usually and preferably added to the water or aqueous acid solution, but the water or aqueous acid solution can be added to the solvent solution. Any suitable temperature can be employed; however, temperatures of from 0° C. to about 100° C., preferably from about 5° C. to about 25° C., are particularly suitable.

In the separation step, the aqueous and organic phases can be separated by any known means such as, for example, by methods involving differences in specific gravity, including tilting-plate separation, or by injection of air bubbles in the phase mixture (air flotation) and the like.

The organic phase from the separation step can then be disposed of by any environmentally acceptable means such as by burning.

The precipitated copper metal can be recovered by any suitable means such as filtration, decantation, centrifugation and the like. The resulting aqueous salt containing stream can then be disposed of by passing it through biotreatment ponds.

The following examples are illustrative of the present invention, but are not to be construed as to limiting the scope thereof in any manner.

EXAMPLE 1

To a beaker containing 148.4 g of an aqueous solution of 1 molar HCl was added, at room temperature (23° C.) 51.710 g of a spent $CuAlCl_4$.toluene complexing solution containing 0.1179 moles of $CuAlCl_4$ (0.1179 equivalents of $Cu^+$). The mixture was stirred for 30 minutes during which time an exotherm was noted. The mixture resulted in an aqueous phase and an organic phase which were separated.

To the aqueous phase was added 2.7 g (0.222 equivalents) of powdered magnesium which precipitated copper metal, 5 grams (0.0787 equivalents) of which was recovered by filtration. There was recovered 66.75% of the copper contained in the spent solution.

EXAMPLE 2

To a beaker containing 203.13 g of water was added 69.36 g of spent $CuAlCl_4$.toluene complexing solution containing 10.25 g (0.1613 moles) of copper. At the onset of this addition the temperature was 6° C. and the highest temperature during hydrolysis was 47° C. After cooling to room temperature, the phases were separated into an organic and an aqueous phase by means of a separatory funnel. The aqueous phase, containing the undissolved cuprous chloride, was treated with air via a gas dispersion tube and the solution was agitated by a magnetic stirrer. The then solubilized cupric chloride (0.323 equivalents of $Cu^{++}$) was reduced to copper metal by the addition of 4.40 g (0.362 equivalents) of magnesium. The magnesium was added slowly. There was recovered by filtration 9.76 g of copper metal resulting in an efficiency of copper removal of 95.22% from that contained in the spent solution.

We claim:

1. A process for removing copper from spent cuprous aluminum tetrahalide complexing solutions which process comprises:
   (1) mixing said complexing solution with at least about 0.5 parts of water per part of complexing solution, thereby forming a solid precipitate of cuprous halide, an organic phase and an aqueous phase;
   (2a) contacting, while agitating, the mixture of step (1) with a suitable oxidizing agent in a sufficient quantity for a time sufficient to convert the water insoluble cuprous halide to water soluble cupric halide; and separating the organic phase and the aqueous phase; or alternatively
   (2b) separating the organic phase and the aqueous phase and contacting, while agitating, the aqueous phase containing the insoluble cuprous halide with a suitable oxidizing agent in a suitable quantity for a time sufficient to convert the water insoluble cuprous halide to water soluble cupric halide;
   (3) contacting the aqueous phase containing the dissolved cupric halide with an environmentally acceptable metal higher than copper in the electromotive series thereby precipitating copper metal and
   (4) recovering by any suitable means, the precipitated copper metal.

2. A process for removing copper from spent cuprous aluminum tetrahalide complexing solutions which process comprises:
   (1) mixing said complexing solution with at least about 0.5 parts of a 1 molar to about 6 molar solution of a non-oxidizing acid selected from the group consisting of sulfuric acid or phosphoric acid per part by weight of complexing solution, thereby forming an organic phase and an aqueous phase containing cuprous halide;
   (2) separating the organic phase and the aqueous phase;
   (3) contacting the aqueous phase containing the dissolved cuprous halide with an environmentally acceptable metal higher than copper in the electromotive series thereby precipitating copper metal and
   (4) recovering by any suitable means, the precipitated copper metal.

3. The process of claims 1 or 2 wherein the metal higher than copper in the electromotive series is iron, aluminum, magnesium or mixtures thereof.

4. The process of claim 3 wherein the quantity of water is from about 0.5 to about 3 parts per part by weight of complexing solution and the quantity of metal higher than copper in the electromotive series is from 1 to about 10 equivalents per equivalent of copper.

5. The process of claim 4 wherein said complexing solution is cuprous aluminum tetrachloride in toluene.

6. The process of claim 5 wherein the quantity of water is from about 0.95 to about 1.05 parts per part by weight of complexing solution and the quantity of metal higher than copper in the electromotive series is from about 1 to about 2 equivalents per equivalent of copper and wherein said oxidizing agent is oxygen either pure or as air.

7. The process of claim 6 wherein the metal higher than copper in the electromotive series is magnesium.

8. The process of claim 6 wherein said oxidizing agent is calcium hypochlorite and wherein the aqueous mixture is acidified to lower the pH below 7 before or during contact with said calcium hypochlorite.

9. The process of claim 3 wherein the quantity of aqueous acid solution is from about 0.5 to about 3 parts per part by weight of complexing solution and the quantity of metal higher than copper in the electromotive series is from 1 to about 10 equivalents per equivalent of copper.

10. The process of claim 5 wherein the quantity of aqueous acid solution is from about 0.95 to about 1.05 parts per part by weight of complexing solution and the quantity of metal higher than copper in the electromotive series is from about 1 to about 2 equivalents per equivalent of copper and wherein said oxidizing agent is oxygen either pure or as air.

* * * * *